(12) United States Patent
Frasch et al.

(10) Patent No.: US 7,467,811 B2
(45) Date of Patent: Dec. 23, 2008

(54) THREADED PIPE COUPLING, UNION NUT, CONNECTION STUB, AND PIPE FOR A THREADED PIPE COUPLING

(75) Inventors: Juergen Frasch, Holzgerlingen (DE); Stephan Wehr, Heiligenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 407 days.

(21) Appl. No.: 11/295,645

(22) Filed: Dec. 7, 2005

(65) Prior Publication Data

US 2006/0125231 A1    Jun. 15, 2006

(30) Foreign Application Priority Data

Dec. 13, 2004    (DE)    ......................... 10 2004 059 909

(51) Int. Cl.
    *F16L 55/00*    (2006.01)
(52) U.S. Cl. .......................................... 285/13; 285/14
(58) Field of Classification Search ................... 285/13, 285/14
    See application file for complete search history.

(56) References Cited

U.S. PATENT DOCUMENTS

| | | | | |
|---|---|---|---|---|
| 2,542,877 A * | 2/1951 | Newcum | ..................... | 285/13 |
| 2,942,894 A * | 6/1960 | Smith | ..................... | 285/13 |
| 3,288,494 A * | 11/1966 | Callahan, Jr. et al. | ......... | 285/14 |
| 3,485,516 A * | 12/1969 | Kell et al. | ..................... | 285/14 |
| 3,612,577 A * | 10/1971 | Pope et al. | ..................... | 285/14 |
| 4,113,284 A * | 9/1978 | Blocker | ..................... | 285/14 |
| 4,185,462 A * | 1/1980 | Morse et al. | ..................... | 60/761 |
| 4,623,123 A * | 11/1986 | Traylor | ..................... | 251/340 |
| 5,094,480 A * | 3/1992 | Boileau | ..................... | 285/14 |
| 5,197,766 A * | 3/1993 | Glover et al. | ..................... | 285/14 |
| 5,263,312 A * | 11/1993 | Walker et al. | ..................... | 60/797 |
| 5,591,389 A * | 1/1997 | Esrock | ..................... | 264/171.12 |
| 5,645,301 A * | 7/1997 | Kingsford et al. | ..................... | 285/14 |
| 5,675,618 A * | 10/1997 | Amburn et al. | ..................... | 376/203 |
| 5,918,911 A * | 7/1999 | Sims | ..................... | 285/13 |
| 6,319,001 B1 * | 11/2001 | Esrock | ..................... | 433/80 |
| 6,431,608 B1 * | 8/2002 | Kato | ..................... | 285/13 |
| 6,695,000 B2 * | 2/2004 | Hall et al. | ..................... | 137/312 |
| 6,851,720 B2 * | 2/2005 | Hayashi et al. | ..................... | 285/13 |
| 6,945,566 B2 * | 9/2005 | Weiss | ..................... | 285/92 |
| 7,134,695 B2 * | 11/2006 | Jewett et al. | ..................... | 285/141.1 |
| 7,178,838 B2 * | 2/2007 | Chelchowski et al. | ....... | 285/354 |

* cited by examiner

*Primary Examiner*—Aaron M Dunwoody
(74) *Attorney, Agent, or Firm*—Ronald E. Greigg

(57) ABSTRACT

A threaded pipe coupling is disclosed which comprises a connection stub, a pipe, and a union nut, and in which any leakage quantities that occur can be carried away through the union nut.

21 Claims, 3 Drawing Sheets

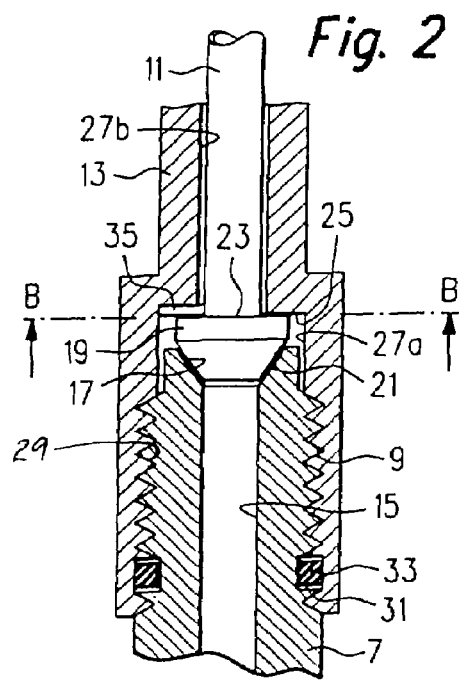
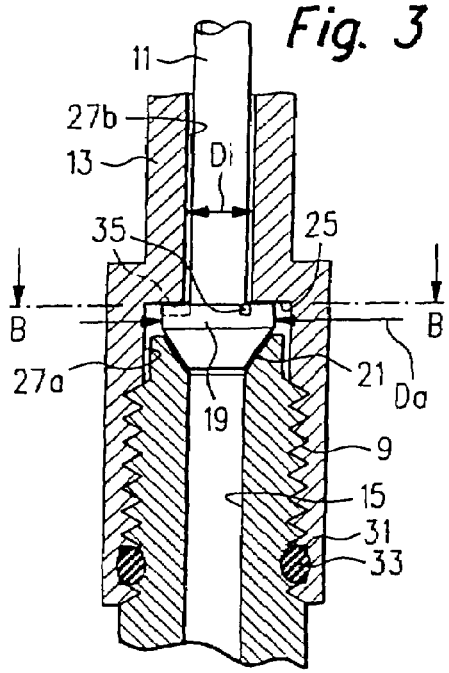
Fig. 2
Fig. 3
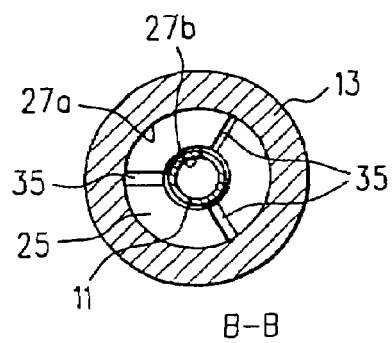
B-B
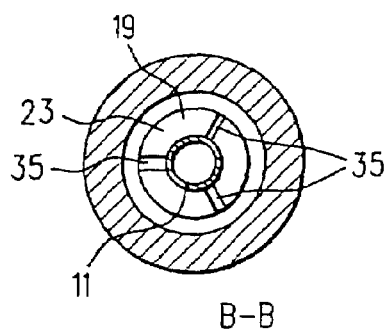
B-B

THREADED PIPE COUPLING, UNION NUT, CONNECTION STUB, AND PIPE FOR A THREADED PIPE COUPLING

CROSS-REFERENCE TO RELATED APPLICATIONS

This application is based on German Patent Application 10 2004 059 909.2 filed Dec. 13, 2004, upon which priority is claimed.

BACKGROUND OF THE INVENTION

1. Field of the Invention

The invention is directed to an improved threaded pipe coupling, comprising a connection stub, a pipe with a nipple, and a union nut.

2. Description of the Prior Art

Threaded pipe couplings have long been known in the prior art, and are used for instance in the high-pressure region of fuel injection systems for internal combustion engines. A threaded coupling of this kind may for instance be provided on both ends of a high-pressure line that is mounted between a common rail and an injector.

In some internal combustion engines, the problem arises that the injectors are located entirely inside the cylinder head cap of the engine. This means that only the high-pressure line is passed through the cylinder head cap. As a consequence, any leakages that occur at the threaded pipe coupling between the high-pressure line and the injector dilute and thin the motor oil which can cause engine damage. In rare cases, but these cannot be precluded, it is even possible for the leakages to get into the intake tube via the venting of the valve drive and thus can get into the combustion chambers of the engine. This can lead to dangerous situations.

OBJECT AND SUMMARY OF THE INVENTION

In the threaded pipe coupling of the invention, comprising a union nut, a pipe, and a connection stub, the danger mentioned above is precluded by providing that the leakage quantities that occur in the event of a leaking threaded pipe coupling cannot reach the motor oil of the engine but instead are diverted outside, that is, through the cylinder head cap of the engine. Outside, they can be collected and carried away, thus precluding thinning of the motor oil.

These advantages are attained according to the invention by a union nut for a threaded pipe coupling, having a graduated inner bore, in which a shoulder is embodied between the first portion and a second portion of the inner bore, and in which the first portion has a greater diameter than the second portion, by providing that at least one indentation is embodied on the shoulder; and that the at least one indentation extends from the first portion to the second portion. This indentation makes it possible for leakage that occurs between a nipple of the high-pressure line and the sealing face in the connection stub to be diverted through the shoulder out of the union nut. The indentation has no adverse effects on the contact pressure exerted on the nipple by the union nut. If the union nut is made long enough that one end of it protrudes through the cylinder head cap of the engine, it is then assured that the leakage cannot reach the motor oil of the engine but instead will be diverted to the outside.

Advantageous features of the union nut of the invention provide that the first portion has a female thread, so that the union nut can be screwed to a connection stub.

To assure that the leakage cannot get through the thread to reach the portion of the cylinder head that is wetted by motor oil, means are further provided according to the invention for sealing off the female thread. These means may alternatively or cumulatively be a groove in the inner bore for receiving a sealing ring, in particular a PTFE ring or an O-ring. However, it is also possible to coat the female thread with a sealing medium which is activated when the union nut is screwed together with the connection stub.

The advantages according to the invention can also be attained in a pipe having a nipple, that nipple having a sealing face and a bearing face, by providing that at least one indentation is embodied in the bearing face; and that the at least one indentation extends from an inside diameter to an outside diameter of the bearing face. In this embodiment of the threaded pipe coupling of the invention as well, it can be assured by the indentation in the bearing face that any leakages that occur can be carried through the threaded pipe coupling and diverted out of the cylinder head cap.

In pipes according to the invention, the sealing faces may be embodied as hemispherical, frustoconical, or flat. Correspondingly, it is possible to embody the bearing face as flat, hemispherical or frustoconical. However, the pipe of the invention is not limited to sealing faces and bearing faces of the aforementioned types.

The advantages of the invention can be attained in a connection stub for a threaded pipe coupling having an inner bore, having a sealing seat, and having a male thread, by providing that on the connection stub, there are means for sealing off the connection stub from a union nut. These means may be embodied as an annular groove, which serves to receive a sealing ring. The annular groove may be located in the region of the male thread or in a region adjoining it. Among others, PTFE rings or O-rings can be considered for the sealing rings. It is furthermore possible to coat the male thread with a sealing medium.

If the connection stub of the invention is embodied as an internally threaded stub, or in other words if the connection stub has an internal thread on its end opposite the male thread, then according to the invention it is further provided that a first biting edge is embodied concentrically with the inner bore, and outside the first biting edge there is a leakage bore, and that means are provided which seal off the leakage bores from the outside. These means may for instance be a sealing ring and/or a second biting edge. It is recommended that both the sealing ring and the second biting edge be made concentric with the inner bore, since as a result the production costs can be minimized, and the sealing action can be assured equally well over the entire circumference of the end face of the connection stub.

BRIEF DESCRIPTION OF THE DRAWINGS

The invention will be better understood and further objects and advantages thereof will become more apparent from the ensuing detailed description of preferred embodiments, taken in conjunction with the drawings, in which:

FIGS. 2 through 4 show further exemplary embodiments.

DESCRIPTION OF THE PREFERRED EMBODIMENTS

Figure 1:
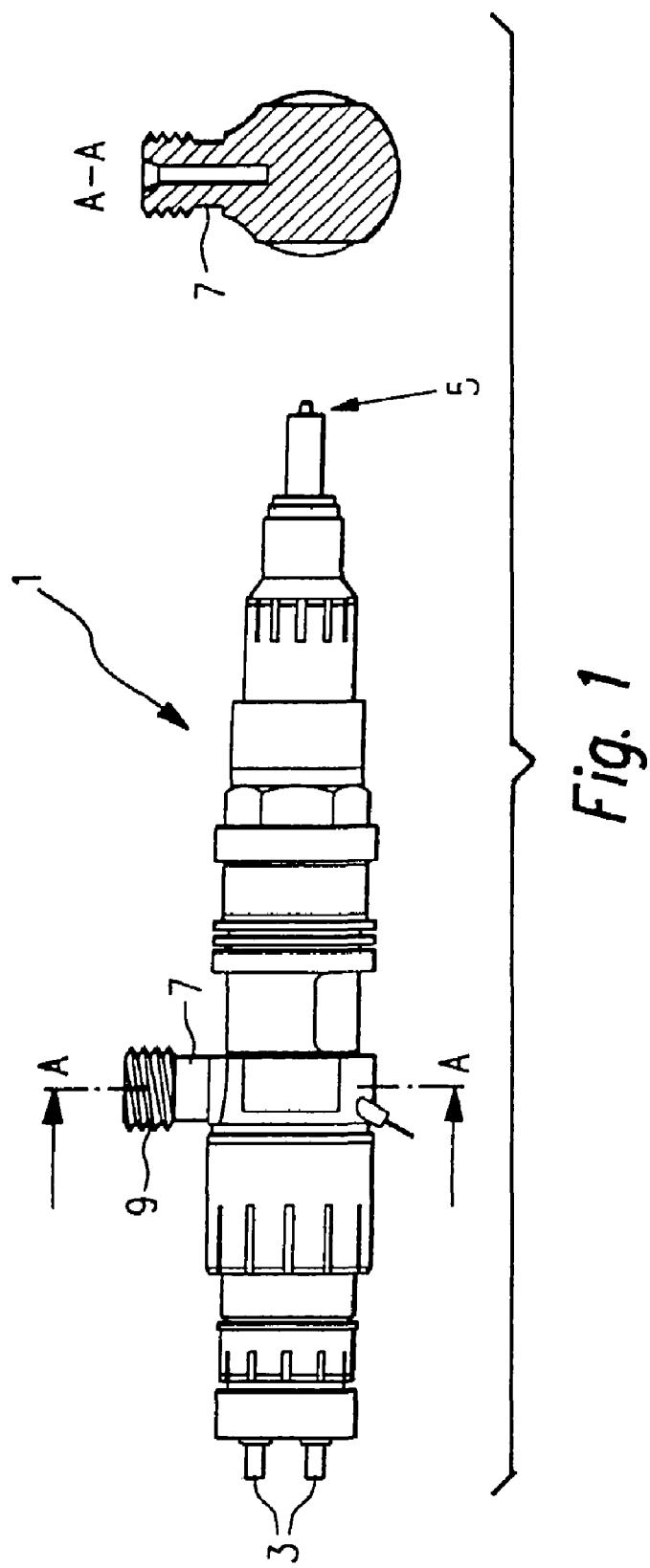
FIG. 1 is a schematic illustration of an injector with a connection, in a side view and in section taken along the line A-A.

In FIG. 1, a side view of an injector 1 is shown. On one end of the injector 1, there are electrical terminals 3. The other end of the injector 1 is screwed into the cylinder head (not shown) of an internal combustion engine in such a way that the tip 5 of the injector protrudes into the combustion chamber of the engine.

In some mass-produced internal combustion engines, the entire injector 1 is located below a cylinder head cap, not shown. This means that the entire injector 1 is bathed by motor oil of the engine.

A connection stub 7, which has a male thread 9, is embodied approximately in the middle of the injector 1. With the aid of a union nut, not shown in FIG. 1, a pipe (also not shown) is screwed onto this connection stub 7. During engine operation, the fuel located in the pipe is at a very high pressure of up to 1800 bar. If the threaded coupling of the pipe to the connection stub 7 should leak, then unless other provisions are made, fuel would get into the motor oil that surrounds the injector 1. The resultant thinning of the motor oil adversely affects its lubricating properties and causes considerable damage to the engine. With the aid of a threaded pipe coupling according to the invention, which will be described in detail below in terms of the exemplary embodiments in conjunction with FIGS. 2, 3 and 4, the thinning of the motor oil from leakages from the threaded pipe coupling is reliably avoided.

In FIG. 2, a first exemplary embodiment of a threaded pipe coupling of the invention, comprising the connection stub 7, a pipe 11, and a union nut 13, is shown in section. As can be seen from FIG. 2, the connection stub 7 has an inner bore 15, which discharges into a frustoconical sealing seat 17.

On its end toward the connection stub 7, the pipe 11 has a nipple 19. A sealing face 21 oriented toward the sealing seat 17 is embodied on the nipple 19.

On the end of the nipple 19 opposite from the sealing face 21, a bearing face 23 is embodied. A shoulder 25 of the union nut 13 presses against this bearing face 23 when the union nut 13 is screwed onto the male thread 9 of the connection stub 7. As a result, the sealing face 21 of the nipple 19 is pressed against the sealing seat 17 of the connection stub 7 to produce a high-pressure-proof threaded coupling between the pipe 11 and the connection stub 7.

The union nut 13 has a graduated inner bore 27a and 27b. The shoulder 25 of the union nut 13 is embodied at the transition between the first portion 27a and the second portion 27b of the inner bore 27. In the region of the first portion 27a, there is a female thread 29.

If a threaded pipe coupling of the prior art were to leak, fuel can pass through the threaded coupling between the female thread 29 and the male thread 9 to reach the motor oil that surrounds the injector and hence also the connection stub 7. According to the invention, it can be provided that one or more indentations 35 are made in the shoulder 25 of the union nut, so that the leakage if it occurs can pass from the first portion 27a to the second portion 27b of the union nut 13. If the portion 27b of the union nut 13 is made long enough that it protrudes out of a cylinder head cap (not shown), it is thus assured that the leakage in the annular gap between the inner bore 27b and the pipe 11 were passed to the outside, out of the regions of the engine that are lubricated by motor oil.

At the same time, it must also be assured that no fuel can get into the motor oil through the threaded coupling comprising the female thread 29 and the male thread 9. This can be accomplished for instance by means of a suitable coating of a sealing medium applied onto the female thread 29 and/or of the male thread 9. It is furthermore possible to provide an annular groove 31 into the connection stub 7, which groove serves to receive a sealing ring 33. The sealing ring 33 may be made for instance from PTFE (Teflon®) or an elastomer. Various cross-sectional shapes, such as square or round cross sections, may also be employed. It is also understood that it is unnecessary to form the annular groove 31 into the connection stub in the region of the male thread 9. Alternatively, it is possible to form the annular groove 31 into the end of the male thread 9, for example, so that it simultaneously takes on the function of a relief groove for the male thread 9.

To improve the sealing action of the sealing ring 33, it may also be provided that in the region of the sealing ring 33, the union nut has a smooth cylindrical surface instead of a female thread 29. Which of the variants mentioned will be preferred in an individual case is a structural provision that can be made by one skilled in the art as needed and with awareness of the other peripheral conditions.

For clarification of what has been said, a section taken along the line B-B is shown below FIG. 2.

In FIG. 3, a further exemplary embodiment of a threaded pipe coupling of the invention is shown. Identical components are identified by the same reference numerals, and what has been said in conjunction with FIG. 2 applies accordingly.

The essential distinctions pertain to the sealing ring 33 and the nipple 19. In the exemplary embodiment of FIG. 3, the sealing ring 33 is embodied as an O-ring. In contrast to the exemplary embodiment of FIG. 2, in the exemplary embodiment of FIG. 3 the indentations 35 are made not in the union nut 13 but in the nipple 19 of the pipe 11. The effect, namely that the leakage can pass from the first portion 27a through the indentations 35 into the portion 27b of the union nut 13, is the same.

In the lower part of FIG. 3, a view is shown along the line B-B from above onto a pipe 11 of the invention, in which the indentations 35 are embodied in the nipple 19.

Figure 4:
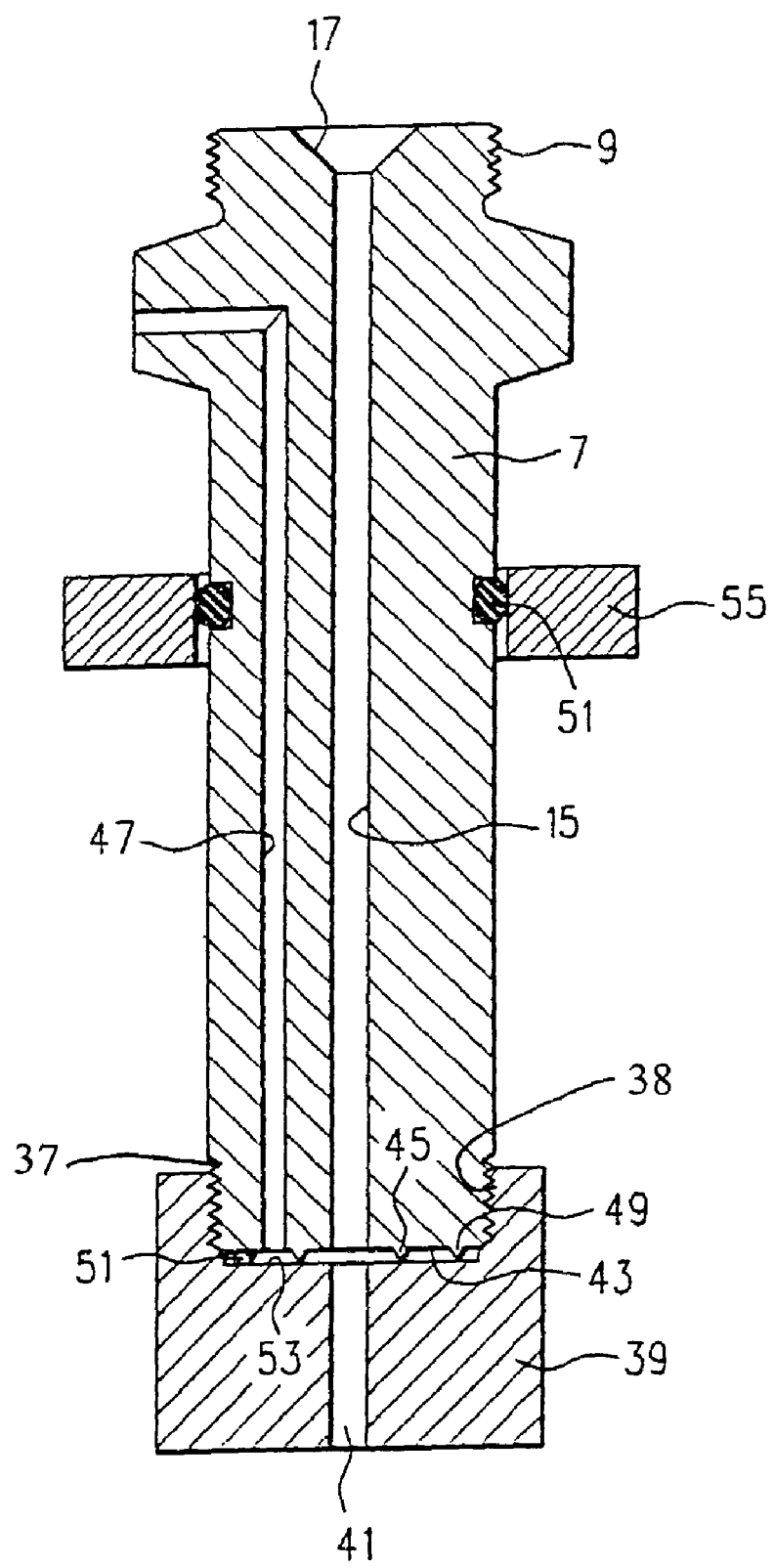

In FIG. 4, an exemplary embodiment of a connection stub 7 of the invention is shown, in which an external thread 37 is provided on the end of the connection stub 7 opposite from the male thread 9. The male thread 9 serves to screw on a union nut 13, as has been explained in conjunction with the exemplary embodiments of FIGS. 2 and 3. In the exemplary embodiment of FIG. 4, the connection stub 7 is screwed into a component 39 with the aid of internal thread 38 in the component, which is shown engaged with the external thread 37 on the connection stub 7. The component 39 may for instance be a cylinder head of an internal combustion engine. The component 39 has a through bore 41, which is located in the extension of the inner bore 15 of the connection stub 7.

So that no fuel can emerge from the end face 43 of the connection stub 7, a first biting edge 45 is provided on the end face 43. The first biting edge 45 is located concentrically with the inner bore and the through bore 41. If the first biting edge 45 leaks during engine operation, the leakage could flow past the first biting edge 45 to reach the environment. To prevent this, a leakage bore 47 is made in the connection stub 7 of the invention; it discharges into the end face 43 of the connection stub 7, outside the first biting edge 45. To assure that the leakage will be carried away through the leakage bore 47, a second biting edge 49 can for instance be provided, which is located concentrically with the first biting edge 45 and which surrounds the leakage bore 47. This exemplary embodiment is shown on the right-hand side of FIG. 4.

Alternatively, it is also possible to place a sealing ring 51 in the step in the component 39. This variant is shown on the left-hand side of FIG. 4. In both variants, it is possible for the leakage that occurs to be carried out of a housing cap 55 through the leakage bore 47. Between the connection stub 7 and the housing cap 55, a sealing ring 51 is provided. This sealing ring prevents motor oil, located for instance between the housing cap 55 and the component 39, from being able to get into the environment.

The foregoing relates to preferred exemplary embodiments of the invention, it being understood that other variants and embodiments thereof are possible within the spirit and scope of the invention, the latter being defined by the appended claims.

We claim:

1. A threaded pipe coupling, having a union nut with a graduated inner bore, in which a shoulder is embodied in the union nut between a first portion and a second portion of the inner bore, and in which the first portion of the inner bore has a greater diameter than the second portion, and at least one indentation is embodied on the shoulder, said at least one indentation extending radially with respect to a centerline of the inner bore from the first portion of the inner bore to the second portion of the inner bore, said at least one indentation allowing leakage to be diverted through the shoulder from the first portion of the inner bore to the second portion of the inner bore.

2. A threaded pipe coupling, comprising:
a union nut;
a connection stub having a sealing seat and a first external thread disposed thereon, the connection stub having a second thread on an end opposite from the first external thread and a first biting edge disposed on an end face of the end opposite from the first external thread, wherein the first biting edge is located concentrically with an inner bore of the connection stub; and
sealing means provided on the connection stub for sealing off the connection stub from the union nut.

3. The threaded pipe coupling as recited in claim 2, wherein the connection stub has a leakage bore located therein and disposed radially outside the first biting edge.

4. The threaded pipe coupling as recited in claim 3, further comprising sealing means for sealing the leakage bore off from outside the connection stub.

5. The threaded pipe coupling as recited in claim 2, wherein the sealing means are embodied as an annular groove in the connection stub, and further comprising a sealing ring received in the annular groove.

6. The threaded pipe coupling as recited in claim 5, wherein the annular groove is located in the region of the male thread.

7. The threaded pipe coupling as recited in claim 5, wherein the sealing ring is an O-ring.

8. The threaded pipe coupling as recited in claim 2, wherein the sealing means comprises a coating of the first external thread with a sealing medium.

9. The threaded pipe coupling as recited in claim 4, wherein the sealing means for sealing off the leakage bore is embodied as a sealing ring.

10. The threaded pipe coupling as recited in claim 4, wherein the sealing means for sealing off the leakage bore is embodied as a second biting edge concentric with the first biting edge.

11. The threaded pipe coupling as recited in claim 2, wherein the union nut comprises a graduated inner bore, in which a shoulder is embodied in the union nut between a first portion and a second portion of the inner bore, and in which the first portion has a greater diameter than the second portion, at least one indentation is embodied on the shoulder, wherein the at least one indentation extends radially with respect to a centerline of the inner bore from the first portion of the inner bore to the second portion of the inner bore, the at least one indentation allowing leakage to be diverted through the shoulder from the first portion of the inner bore to the second portion of the inner bore.

12. The threaded pipe coupling as recited in claim 11, wherein the first portion of the inner bore an internal thread.

13. The threaded pipe coupling as recited in claim 11, further comprising a sealing ring groove embodied in the first portion of the inner bore, and a sealing ring disposed in the sealing ring groove.

14. The threaded pipe coupling as recited in claim 13, wherein the first portion of the inner bore has an internal thread.

15. The threaded pipe coupling as recited in claim 13, wherein the sealing ring is an O-ring.

16. The threaded pipe coupling as recited in claim 12, further comprising a sealing medium coating applied on the internal thread.

17. The threaded pipe coupling as recited in claim 2, wherein the threaded pipe coupling is used in a fuel injection system of an internal combustion engine, in particular on an injector, a common rail, or some other component subjected to high pressure.

18. The threaded pipe coupling as recited in claim 12, wherein the second thread is received by a mating thread of the component.

19. The threaded pipe coupling as recited in claim 2, further comprising a pipe having a nipple, the nipple having a sealing face and a bearing face, the bearing face having at least one indentation embodied therein, and the at least one indentation extending from an inside diameter of the bearing face to an outside diameter of the bearing face.

20. The threaded pipe coupling as recited in claim 19, wherein the sealing face is embodied as hemispherical, frustoconical, or flat.

21. The threaded pipe coupling as recited in claim 19, wherein the bearing face is embodied as flat, hemispherical or frustoconical.

* * * * *